United States Patent
Tanaka et al.

(10) Patent No.: US 11,161,516 B2
(45) Date of Patent: Nov. 2, 2021

(54) VEHICLE CONTROL DEVICE

(71) Applicants: AISIN SEIKI KABUSHIKI KAISHA, Kariya (JP); AISIN AW CO., LTD., Anjo (JP)

(72) Inventors: Yu Tanaka, Nagoya (JP); Toyoji Hiyokawa, Okazaki (JP)

(73) Assignees: AISIN SEIKI KABUSHIKI KAISHA, Kariya (JP); AISIN AW CO., LTD., Anjo (JP)

( * ) Notice: Subject to any disclaimer, the term of this patent is extended or adjusted under 35 U.S.C. 154(b) by 119 days.

(21) Appl. No.: 16/590,697

(22) Filed: Oct. 2, 2019

(65) Prior Publication Data

US 2020/0108836 A1 Apr. 9, 2020

(30) Foreign Application Priority Data

Oct. 3, 2018 (JP) .............................. JP2018-188679

(51) Int. Cl.
*B60W 40/072* (2012.01)
*B62D 6/00* (2006.01)
(Continued)

(52) U.S. Cl.
CPC ........... *B60W 40/072* (2013.01); *B62D 6/002* (2013.01); *G05D 1/021* (2013.01); *G08G 1/168* (2013.01);
(Continued)

(58) Field of Classification Search
CPC .. G05D 3/00; G05D 2201/00; G05D 2201/02; G05D 2201/0211;
(Continued)

(56) References Cited

U.S. PATENT DOCUMENTS 5,949,375 A * 9/1999 Ishiguro .................. G01S 19/49
342/457
6,067,502 A * 5/2000 Hayashida ........... G01C 21/367
340/990

(Continued)

FOREIGN PATENT DOCUMENTS

JP 2007-316025 A 12/2007
WO 2019/098353 A1 5/2019

OTHER PUBLICATIONS

U.S. Appl. No. 16/761,070, Toyoji Hiyokawa, filed May 1, 2020.
U.S. Appl. No. 16/761,070, filed May 1, 2020 (Hiyokawa).

*Primary Examiner* — Anthony R Jimenez
(74) *Attorney, Agent, or Firm* — Sughrue Mion, PLLC

(57) ABSTRACT

According to one embodiment, by way of example, a vehicle control device includes: an acquisition unit configured to acquire map data indicating an absolute azimuth of a linear road surface sign disposed on a road surface on which a vehicle travels, and image data obtained by imaging surroundings of the vehicle with a vehicle-mounted camera included in the vehicle; and a correction unit configured to detect the road surface sign from the acquired image data, calculate a relative azimuth of the road surface sign with respect to the vehicle on the image data, calculate a shift of an azimuth in which the vehicle moves based on the calculated relative azimuth and the absolute azimuth of the detected road surface sign indicated by the map data, and correct the azimuth in which the vehicle moves based on the calculated shift.

8 Claims, 12 Drawing Sheets

(51) Int. Cl.
 *G08G 1/16* (2006.01)
 *G05D 1/02* (2020.01)
 *B60W 50/04* (2006.01)

(52) U.S. Cl.
 CPC ... *B60W 2050/046* (2013.01); *B60W 2420/42* (2013.01)

(58) Field of Classification Search
 CPC .. G05D 2201/0216; G05D 1/00; G05D 1/021; G05D 1/0044; G05D 1/02; G05D 1/0268; G05D 1/027; G05D 1/0272; G05D 1/0276; G05D 1/028; G05D 1/0282; B60Q 1/085; B60Q 2300/134; B60Q 2300/112; B60Q 2300/146; B60Q 2300/322; G01C 21/00; G01C 21/005; G01C 21/12; G01C 21/14; G01C 21/26; G01C 21/30; G01C 21/34; G01C 21/3407; G01C 21/343; G01C 21/3438; G01C 21/3638; G01C 21/3641; G01C 3/00; B60W 2050/046; B60W 2050/42; B60W 2050/008; B60W 2050/0081; B60W 2420/52; B60W 2550/00; B60W 2550/40; B60W 2550/402; B60W 2550/404; B60W 2750/00; B60W 2750/30; B60W 2750/306; B60W 2750/308; B60W 2750/40; B60W 20/00; B60W 30/00; B60W 30/06; B60W 30/081; B60W 30/12; B60W 30/14; B60W 30/143; B60W 30/146; B60W 30/16; B60W 30/18; B60W 30/18009; B60W 30/18027; B60W 30/18036; B60W 40/072; G08G 1/165; G08G 1/166; G08G 1/168; B62D 15/0275; B62D 6/002
 USPC .......................................... 701/41, 200, 207
 See application file for complete search history.

(56) References Cited

U.S. PATENT DOCUMENTS

2003/0040866 A1* 2/2003 Kawakami ............. G01C 21/34
 701/420
2010/0169013 A1 7/2010 Nakamura et al.

* cited by examiner

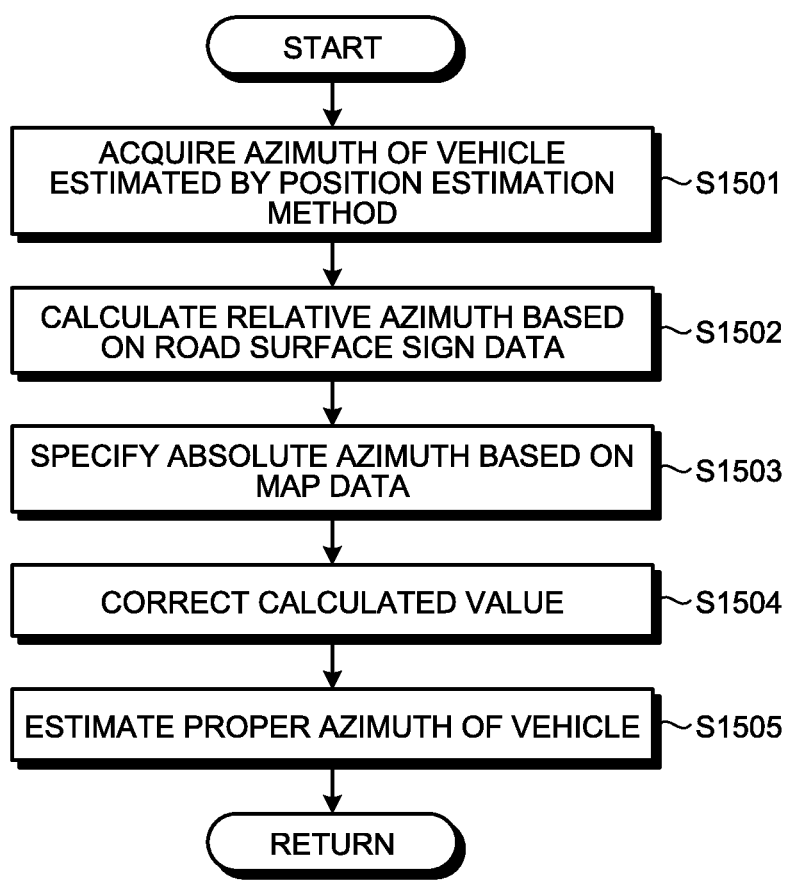

VEHICLE CONTROL DEVICE

CROSS-REFERENCE TO RELATED APPLICATIONS

This application is based upon and claims the benefit of priority from Japanese Patent Application No. 2018-188679, filed Oct. 3, 2018, the entire contents of which are incorporated herein by reference.

FIELD

Embodiments described herein relate generally to a vehicle control device.

BACKGROUND

Among features on a road the positional information of which is stored in a map database, a characteristic feature in an area in which a mobile object such as a vehicle travels is set as a feature required for correcting a self-position of the mobile object. For example, an arrangement pattern of a feature having a high appearance frequency for each of a plurality of types of roads is referred to, and a feature having a high appearance frequency on a road on which the mobile object travels is set as the feature required for correcting the self-position of the mobile object. The set feature is recognized, and the self-position that is estimated by using a Global Positioning System (GPS) or a traveling track is corrected based on a recognition result of the feature. Conventional technologies are described in Japanese Patent Application Laid-open No. 2007-316025, for example.

However, with the technique of correcting the self-position that is estimated by using a GPS or a traveling track based on the recognition result of the feature, estimation accuracy for the self-position can be improved, but an error is easily caused because the mobile object estimates the self position while moving, so that it is difficult to correct an azimuth in which the mobile object moves with high accuracy. On the assumption that the GPS is used, it is difficult to correct the azimuth in which the mobile object moves with the technique described above at a place where signals from satellites cannot be received (for example, a multistory parking lot or an underground parking lot).

SUMMARY

A vehicle control device of an embodiment includes, for example: an acquisition unit that acquires map data indicating an absolute azimuth of a linear road surface sign disposed on a road surface on which a vehicle travels, and image data obtained by imaging surroundings of the vehicle with a vehicle-mounted camera included in the vehicle; and a correction unit that detects the road surface sign from the acquired image data, calculates a relative azimuth of the road surface sign with respect to the vehicle on the image data, calculates a shift of an azimuth in which the vehicle moves based on the calculated relative azimuth and the absolute azimuth of the detected road surface sign indicated by the map data, and corrects the azimuth in which the vehicle moves based on the calculated shift. Thus, one of objects of the embodiment is to provide a vehicle control device that can correctly grasp a current azimuth of a vehicle during automatic traveling.

In the vehicle control device of the embodiments, the correction unit detects the road surface sign from the image data obtained by the vehicle-mounted camera at a predetermined position. Thus, by way of example, a current azimuth of the vehicle during automatic traveling can be correctly grasped.

In the vehicle control device of the embodiments, the correction unit detects the road surface sign from the image data that is obtained by the vehicle-mounted camera at the time when the vehicle stops at the predetermined position. Thus, by way of example, correction accuracy for the azimuth of the vehicle can be improved.

In the vehicle control device of the embodiments, the road surface sign is a roadway outside line drawn on the road surface on which the vehicle travels. Thus, by way of example, the current azimuth of the vehicle during automatic traveling can be correctly grasped without disposing an exclusive road surface sign on the road surface.

In the vehicle control device of the embodiments, the road surface sign is a linear azimuth marker drawn on the road surface on which the vehicle travels. Thus, by way of example, the current azimuth of the vehicle during automatic traveling can be correctly grasped.

In the vehicle control device of the embodiments, the road surface sign is a pedestrian crossing that is a disposed on the road surface on which the vehicle travels. Thus, by way of example, the current azimuth of the vehicle during automatic traveling can be correctly grasped.

In the vehicle control device of the embodiments, the road surface sign is a stop line that is a disposed on the road surface on which the vehicle travels. Thus, by way of example, the current azimuth of the vehicle during automatic traveling can be correctly grasped.

In the vehicle control device of the embodiments, the road surface sign is a linear road surface sign that is disposed on the road surface on which the vehicle travels and different from a parking partition line indicating a parking frame. Thus, by way of example, the current azimuth of the vehicle during automatic traveling can be correctly grasped.

BRIEF DESCRIPTION OF THE DRAWINGS

FIG. 15 is an exemplary and schematic flowchart illustrating a procedure of correction processing for the azimuth of the vehicle performed by the vehicle control device in a case in which traveling control is performed in the present embodiment.

DETAILED DESCRIPTION

The following describes an embodiment based on the drawings. A configuration of the present embodiment described below, and an operation and a result (effect) obtained with the configuration are merely examples, and the embodiment is not limited to the following description.

Figure 1:
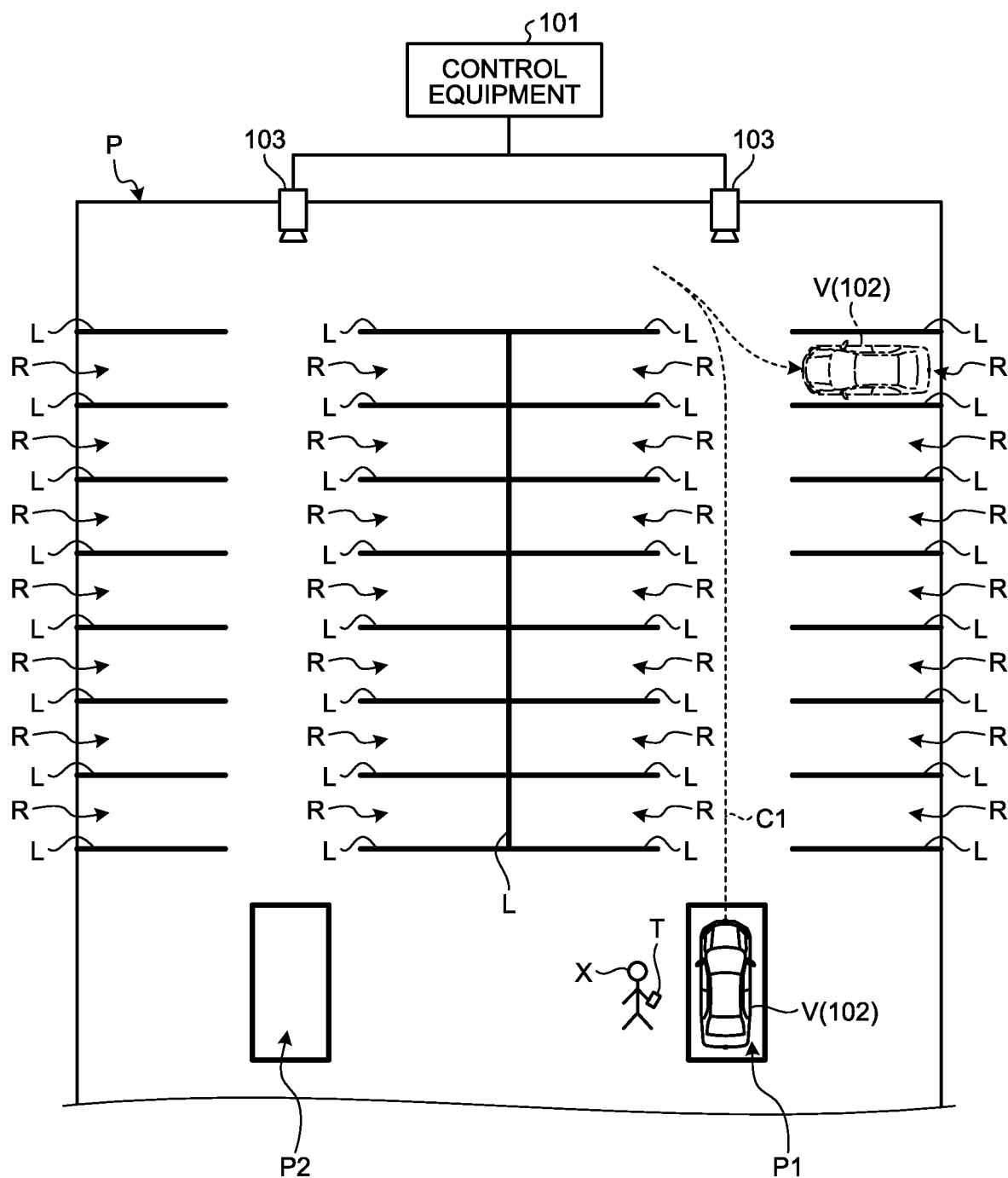
FIG. 1 is an exemplary and schematic diagram illustrating an example of automatic parking in an automated valet parking system according to an embodiment.
Figure 2:
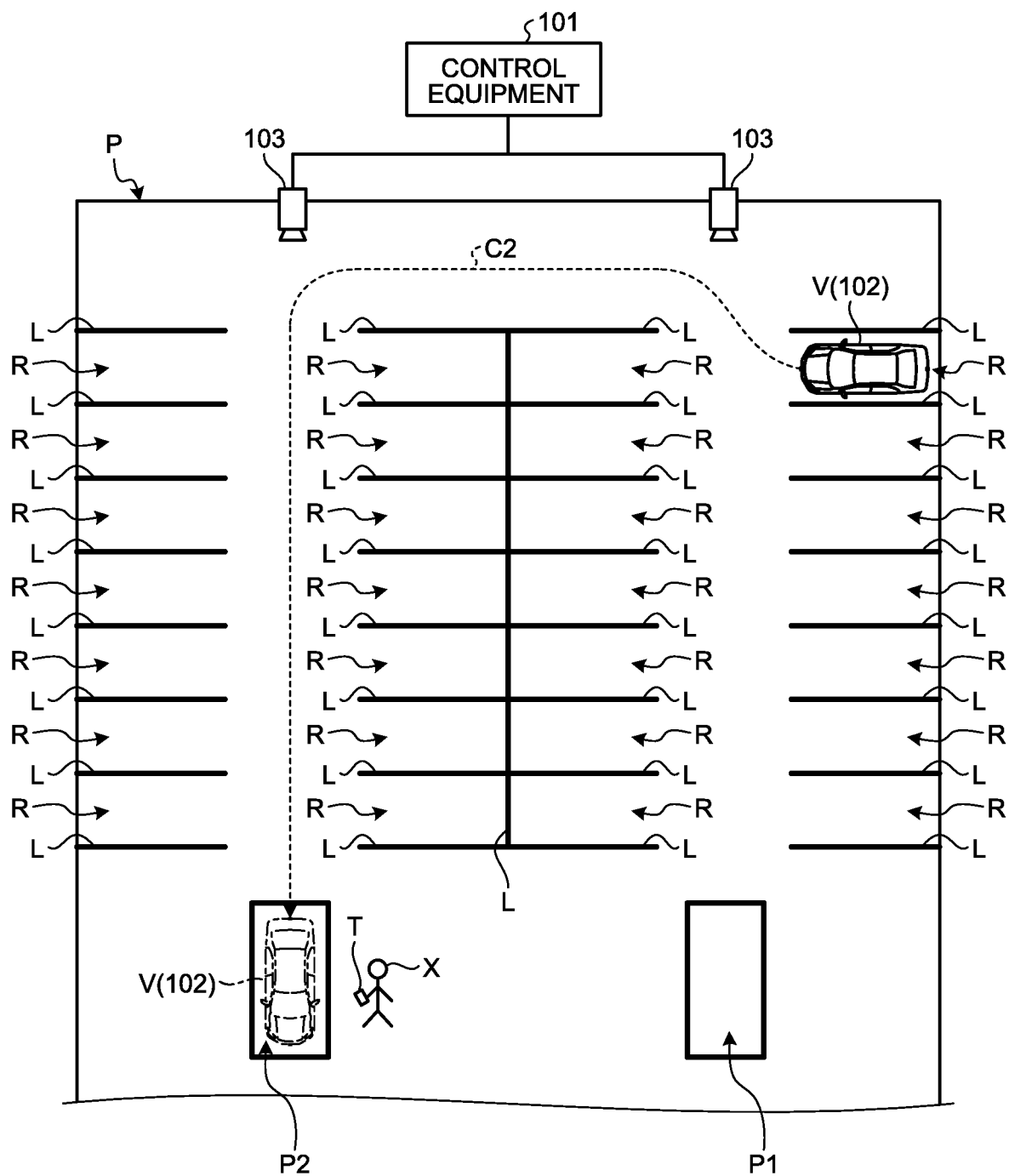
FIG. 2 is an exemplary and schematic diagram illustrating an example of automatic retrieval in the automated valet parking system according to the present embodiment.

FIG. 1 is an exemplary and schematic diagram illustrating an example of automatic parking in an automated valet parking system according to the present embodiment, and FIG. 2 is an exemplary and schematic diagram illustrating an example of automatic retrieval in the automated valet parking system according to the present embodiment. First, with reference to FIG. 1 and FIG. 2, the following describes an outline of the automated valet parking system according to the present embodiment. The automated valet parking system is, for example, a system for implementing automated valet parking including automatic parking and automatic retrieval as described below in a parking lot P including one or more parking regions R partitioned with a predetermined partition line L such as a white line.

As illustrated in FIG. 1 and FIG. 2, in automated valet parking, automatic parking (refer to an arrow C1 in FIG. 1) and automatic retrieval (refer to an arrow C2 in FIG. 2) are performed. The automatic parking is performed such that, after an occupant X gets out a vehicle V in a predetermined getting-out region P1 in the parking lot P, the vehicle V automatically moves from the getting-out region P1 to a vacant parking region R to be parked in response to a predetermined instruction, and the automatic retrieval is performed such that, after the automatic parking is completed, the vehicle V leaves the parking region R and automatically moves to a predetermined getting-in region P2 to be stopped in response to a predetermined call. The predetermined instruction and the predetermined call are implemented by operating a terminal device T by the occupant X.

As illustrated in FIG. 1 and FIG. 2, the automated valet parking system includes control equipment 101 disposed in the parking lot P and a vehicle control system 102 mounted on the vehicle V. The control equipment 101 and the vehicle control system 102 are configured to be able to communicate with each other via wireless communication.

The control equipment 101 is configured to monitor a situation in the parking lot P by receiving image data obtained from one or more surveillance cameras 103 that image the situation in the parking lot P and data output from various sensors (not illustrated) and the like disposed in the parking lot P, and manage the parking region R based on a monitoring result. In the following description, the information received by the control equipment 101 for monitoring the situation in the parking lot P may be collectively referred to as sensor data.

In the embodiment, the number, the arrangement, and the like of the getting-out region P1, the getting-in region P2, and the parking region R in the parking lot P are not limited to the example illustrated in FIG. 1 and FIG. 2. The technique of the embodiment can be applied to parking lots having various configurations different from that of the parking lot P illustrated in FIG. 1 and FIG. 2.

Figure 3:
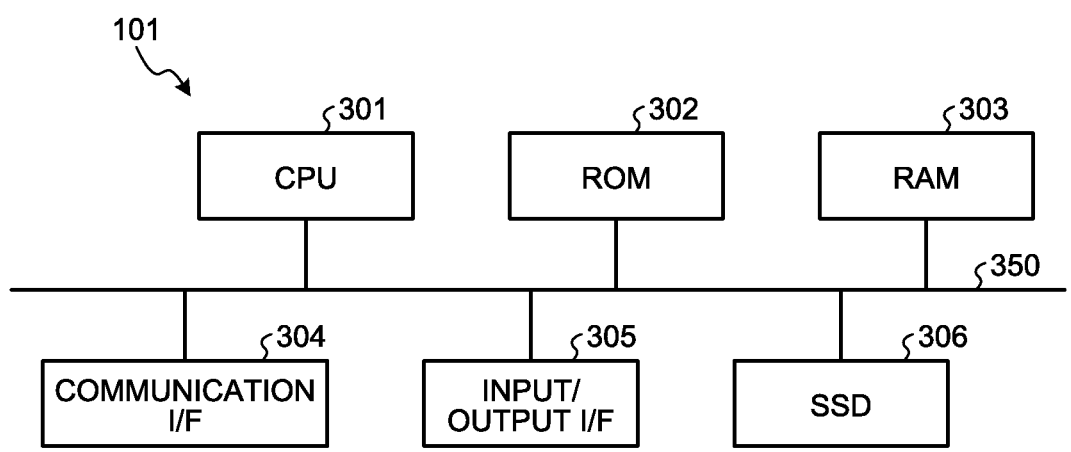
FIG. 3 is an exemplary and schematic block diagram illustrating a hardware configuration of control equipment according to the present embodiment.
Figure 4:
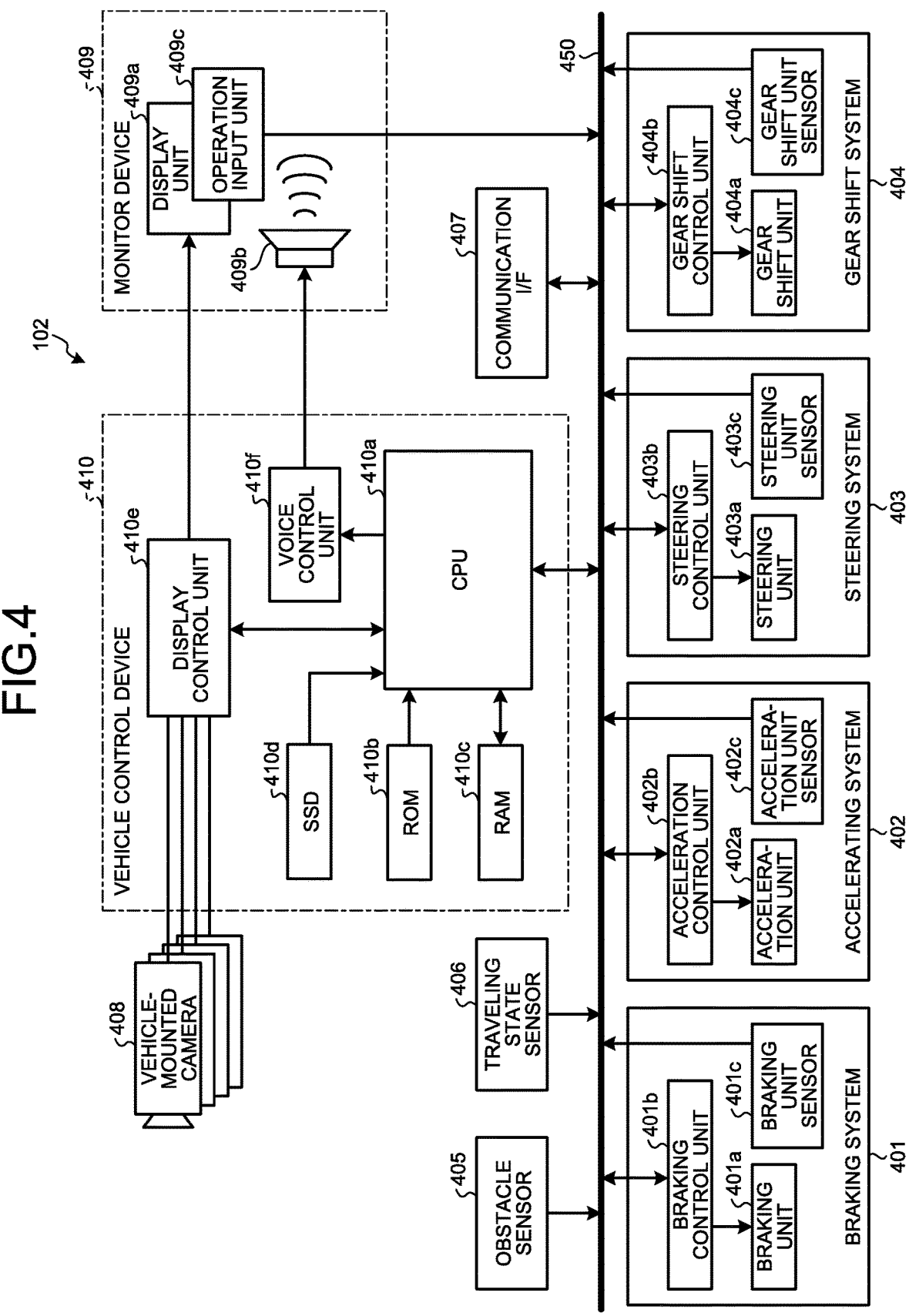
FIG. 4 is an exemplary and schematic block diagram illustrating a system configuration of a vehicle control system according to the present embodiment.

Next, with reference to FIG. 3 and FIG. 4, the following describes configurations of the control equipment and the vehicle control system according to the present embodiment. The configurations illustrated in FIG. 3 and FIG. 4 are merely examples, and the configurations of the control equipment 101 and the vehicle control system 102 according to the present embodiment can be variously set (changed).

First, with reference to FIG. 3, the following describes a hardware configuration of the control equipment 101 according to the embodiment.

FIG. 3 is an exemplary and schematic block diagram illustrating the hardware configuration of the control equipment according to the present embodiment. As illustrated in FIG. 3, the control equipment 101 according to the embodiment includes computer resource similar to that of a typical information processing device such as a personal computer (PC).

In the example illustrated in FIG. 3, the control equipment 101 includes a central processing unit (CPU) 301, a read only memory (ROM) 302, a random access memory (RAM) 303, a communication interface (I/F) 304, an input/output interface (I/F) 305, and a solid state drive (SSD) 306. These pieces of hardware are connected to each other via a data bus 350.

The CPU 301 is a hardware processor that integrally controls the control equipment 101. The CPU 301 reads out various control programs (computer programs) stored in the ROM 302 and the like, and implements various functions in accordance with an instruction prescribed in the various control programs.

The ROM 302 is a non-volatile main storage device that stores parameters and the like required for executing the various control programs described above.

The RAM 303 is a volatile main storage device that provides a working area for the CPU 301.

The communication interface 304 is an interface that implements communication between the control equipment 101 and an external device. For example, the communication interface 304 implements transmission and reception of a signal between the control equipment 101 and the vehicle V (vehicle control system 102) via wireless communication.

The input/output interface 305 is an interface that implements connection between the control equipment 101 and an external device. Examples of the external device include an input/output device and the like used by an operator of the control equipment 101.

The SSD 306 is a non-volatile rewritable auxiliary storage device. In the control equipment 101 according to the embodiment, a hard disk drive (HDD) may be disposed as the auxiliary storage device in place of the SSD 306 (or in addition to the SSD 306).

Next, with reference to FIG. 4, the following describes a system configuration of the vehicle control system 102 according to the present embodiment.

FIG. 4 is an exemplary and schematic block diagram illustrating the system configuration of the vehicle control system according to the present embodiment. As illustrated in FIG. 4, the vehicle control system 102 includes a braking system 401, an accelerating system 402, a steering system 403, a gear shift system 404, an obstacle sensor 405, a traveling state sensor 406, a communication interface (I/F) 407, a vehicle-mounted camera 408, a monitor device 409, a vehicle control device 410, and a vehicle-mounted network 450.

The braking system 401 controls deceleration of the vehicle V. The braking system 401 includes a braking unit 401a, a braking control unit 401b, and a braking unit sensor 401c.

The braking unit 401a is a device for decelerating the vehicle V including a brake pedal, for example.

The braking control unit 401b is, for example, an electronic control unit (ECU) constituted of a computer including a hardware processor such as a CPU. The braking control unit 401b controls a degree of deceleration of the vehicle V by driving an actuator (not illustrated) and actuating the braking unit 401a based on an instruction from the vehicle control device 410.

The braking unit sensor 401c is a device for detecting a state of the braking unit 401a. For example, in a case in which the braking unit 401a includes a brake pedal, the braking unit sensor 401c detects a position of the brake pedal or a pressure applied on the brake pedal as the state of the braking unit 401a. The braking unit sensor 401c outputs the detected state of the braking unit 401a to the vehicle-mounted network 450.

The accelerating system 402 controls acceleration of the vehicle V. The accelerating system 402 includes an acceleration unit 402a, an acceleration control unit 402b, and an acceleration unit sensor 402c.

The acceleration unit 402a is a device for accelerating the vehicle V including an accelerator pedal, for example.

The acceleration control unit 402b is an ECU constituted of a computer including a hardware processor such as a CPU, for example. The acceleration control unit 402b controls a degree of acceleration of the vehicle V by driving the actuator (not illustrated) based on an instruction from the vehicle control device 410 to actuate the acceleration unit 402a.

The acceleration unit sensor 402c is a device for detecting a state of the acceleration unit 402a. For example, in a case in which the acceleration unit 402a includes an accelerator pedal, the acceleration unit sensor 402c detects a position of the accelerator pedal or a pressure applied on the accelerator pedal. The acceleration unit sensor 402c outputs the detected state of the acceleration unit 402a to the vehicle-mounted network 450.

The steering system 403 controls a moving direction of the vehicle V. The steering system 403 includes a steering unit 403a, a steering control unit 403b, and a steering unit sensor 403c.

The steering unit 403a is a device for turning a turning wheel of the vehicle V including a steering wheel and a handle, for example.

The steering control unit 403b is an ECU constituted of a computer including a hardware processor such as a CPU, for example. The steering control unit 403b controls the moving direction of the vehicle V by driving the actuator (not illustrated) based on an instruction from the vehicle control device 410 to actuate the steering unit 403a.

The steering unit sensor 403c is a device for detecting a state of the steering unit 403a. For example, in a case in which the steering unit 403a includes a steering wheel, the steering unit sensor 403c detects a position of the steering wheel or a rotation angle of the steering wheel. In a case in which the steering unit 403a includes a handle, the steering unit sensor 403c may detect a position of the handle or a pressure applied on the handle. The steering unit sensor 403c outputs the detected state of the steering unit 403a to the vehicle-mounted network 450.

The gear shift system 404 controls a transmission gear ratio of the vehicle V. The gear shift system 404 includes a gear shift unit 404a, a gear shift control unit 404b, and a gear shift unit sensor 404c.

The gear shift unit 404a is a device for changing the transmission gear ratio of the vehicle V including a shift lever, for example.

The gear shift control unit 404b is an ECU constituted of a computer including a hardware processor such as a CPU, for example. The gear shift control unit 404b controls the transmission gear ratio of the vehicle V by driving the actuator (not illustrated) based on an instruction from the vehicle control device 410 to actuate the gear shift unit 404a.

The gear shift unit sensor 404c is a device for detecting a state of the gear shift unit 404a. For example, in a case in which the gear shift unit 404a includes a shift lever, the gear shift unit sensor 404c detects a position of the shift lever or a pressure applied on the shift lever. The gear shift unit sensor 404c outputs the detected state of the gear shift unit 404a to the vehicle-mounted network 450.

The obstacle sensor 405 is a device for detecting information related to an obstacle that may be present around the vehicle V. The obstacle sensor 405 includes a range sensor such as sonar that detects a distance to the obstacle, for example. The obstacle sensor 405 outputs the detected information to the vehicle-mounted network 450.

The traveling state sensor 406 is a device for detecting a traveling state of the vehicle V. The traveling state sensor 406 includes, for example, a wheel speed sensor that detects a wheel speed of the vehicle V, an acceleration sensor that detects acceleration in a front and rear direction or a right and left direction of the vehicle V, and a gyro sensor that detects a revolving speed (angular speed) of the vehicle V. The traveling state sensor 406 outputs the detected traveling state to the vehicle-mounted network 450.

The communication interface 407 is an interface that implements communication between the vehicle control system 102 and an external device. For example, the communication interface 407 implements transmission and reception of a signal between the vehicle control system 102 and the control equipment 101 via wireless communication, transmission and reception of a signal between the vehicle control system 102 and the terminal device T via wireless communication, and the like.

The vehicle-mounted camera 408 is a device for imaging a situation around the vehicle V. For example, a plurality of vehicle-mounted cameras 408 are disposed for imaging a region including a road surface on a front side, a rear side, and lateral sides (both of the left and the right sides) of the vehicle V. Image data obtained by the vehicle-mounted camera 408 is used for monitoring a situation around the vehicle V (including detection of the obstacle). The vehicle-mounted camera 408 outputs the obtained image data to the vehicle control device 410. In the following description, the image data obtained from the vehicle-mounted camera 408 and data obtained from the various sensors described above disposed in the vehicle control system 102 may be collectively referred to as sensor data.

The monitor device 409 is disposed on a dashboard and the like in a compartment of the vehicle V. The monitor device 409 includes a display unit 409a, a voice output unit 409b, and an operation input unit 409c.

The display unit 409a is a device for displaying an image in response to an instruction from the vehicle control device 410. The display unit 409a is constituted of a liquid crystal display (LCD) or an organic EL display (OELD: organic electroluminescent display), for example.

The voice output unit 409b is a device for outputting voice in response to an instruction from the vehicle control device 410. The voice output unit 409b is constituted of a speaker, for example.

The operation input unit 409c is a device for receiving an input from an occupant in the vehicle V. The operation input unit 409c is constituted of a touch panel disposed on a display screen of the display unit 409a or a physical operation switch, for example. The operation input unit 409c outputs a received input to the vehicle-mounted network 450.

The vehicle control device 410 is a device for integrally controlling the vehicle control system 102. The vehicle control device 410 is an ECU including computer resource such as a CPU 410a, a ROM 410b, and a RAM 410c.

More specifically, the vehicle control device 410 includes the CPU 410a, the ROM 410b, the RAM 410c, an SSD 410d, a display control unit 410e, and a voice control unit 410f.

The CPU 410a is a hardware processor that integrally controls the vehicle control device 410. The CPU 410a reads out various control programs (computer programs) stored in the ROM 410b and the like, and implements various functions in accordance with instructions prescribed in the various control programs.

The ROM 410b is a non-volatile main storage device that stores parameters and the like required for executing the various control programs described above.

The RAM 410c is a volatile main storage device that provides a working area for the CPU 410a.

The SSD 410d is a non-volatile rewritable auxiliary storage device. In the vehicle control device 410 according to the present embodiment, an HDD may be disposed as the auxiliary storage device in place of the SSD 410d (or in addition to the SSD 410d).

Among various kinds of processing performed by the vehicle control device 410, the display control unit 410e mainly performs image processing for image data obtained from the vehicle-mounted camera 408 or generates image data to be output to the display unit 409a of the monitor device 409.

Among various kinds of processing performed by the vehicle control device 410, the voice control unit 410f mainly generates voice data to be output to the voice output unit 409b of the monitor device 409.

The vehicle-mounted network 450 connects the braking system 401, the accelerating system 402, the steering system 403, the gear shift system 404, the obstacle sensor 405, the traveling state sensor 406, the communication interface 407, the operation input unit 409c of the monitor device 409, and the vehicle control device 410 in a communicable manner.

To implement automatic traveling such as automatic parking and automatic retrieval in the automated valet parking system, it is important to correctly grasp a current position of the vehicle V during automatic traveling. In this point of view, there is conventionally known a position estimation method for estimating the current position of the vehicle V using a detection value of a wheel speed sensor and the like (for example, odometry and Dead Reckoning). However, in this position estimation method, as a moving distance of the vehicle V increases, errors in an estimation result of the current position of the vehicle V are accumulated to be large, and the current position of the vehicle V cannot be correctly grasped. In addition, an error in an azimuth in which the vehicle V moves may be increased.

Thus, in the present embodiment, by causing the vehicle control device 410 to have a function as described below, the current position of the vehicle V can be correctly grasped during automatic traveling for automatic parking and automatic retrieval, and the azimuth in which the vehicle V moves can be corrected.

Figure 5:
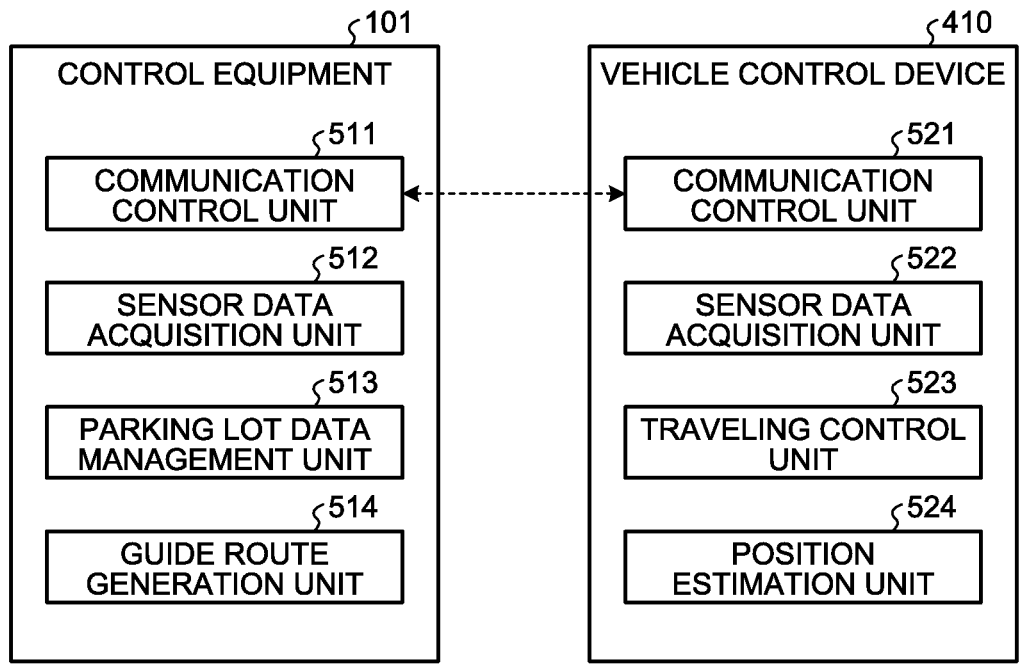
FIG. 5 is an exemplary and schematic block diagram illustrating functions of the control equipment and a vehicle control device according to the present embodiment.

FIG. 5 is an exemplary and schematic block diagram illustrating functions of the control equipment and the vehicle control device according to the present embodiment. The functions illustrated in FIG. 5 are implemented by software and hardware cooperating with each other. That is, in the example illustrated in FIG. 5, the function of the control equipment 101 is implemented as a result that is obtained when the CPU 301 reads out and executes a predetermined control program stored in the ROM 302 and the like, and the function of the vehicle control device 410 is implemented as a result that is obtained when the CPU 410a reads out and executes a predetermined control program stored in the ROM 410b and the like. In the embodiment, part or all of the control equipment 101 and the vehicle control device 410 illustrated in FIG. 5 may be implemented only by exclusive hardware (circuit).

As illustrated in FIG. 5, the control equipment 101 according to the present embodiment includes a communication control unit 511, a sensor data acquisition unit 512, a parking lot data management unit 513, and a guide route generation unit 514 as a functional configuration.

The communication control unit 511 controls wireless communication executed between itself and the vehicle control device 410. For example, the communication control unit 511 authenticates the vehicle control device 410 by transmitting or receiving predetermined data to/from the vehicle control device 410, receives a predetermined completion notification output from the vehicle control device 410 when automatic parking and automatic retrieval are completed, and transmits map data, guide route, and the like of the parking lot P (described later) to the vehicle control device 410 as needed.

The sensor data acquisition unit 512 acquires the sensor data described above from the surveillance camera 103 or various sensors (not illustrated) disposed in the parking lot P. The sensor data acquired by the sensor data acquisition unit 512 (especially, image data obtained from the surveillance camera 103) can be used for grasping a vacancy status of the parking region R, for example.

The parking lot data management unit 513 manages data (information) related to the parking lot P. For example, the parking lot data management unit 513 manages map data of the parking lot P, a vacancy status of the parking region R, and the like. For example, the parking lot data management unit 513 selects one parking region R from among vacant parking regions R at the time when automatic parking is performed, and designates the selected one parking region R as a target parking region as a final destination of the vehicle V in automatic parking. In a case in which the vehicle V moves again after automatic parking is completed and the parking region R is changed, the parking lot data management unit 513 specifies the changed parking region R based on the sensor data acquired from the sensor data acquisition unit 512.

The guide route generation unit 514 generates a guide route to be given to the vehicle control device 410 as an instruction when automatic parking and automatic retrieval are performed. More specifically, the guide route generation unit 514 generates a brief route from the getting-out region P1 to the target parking region as the guide route at the time when automatic parking is performed, and generates a brief route from the target parking region (in a case in which the vehicle V moves after automatic parking, the perking region R in which the vehicle V is currently parked) to the getting-in region P2 as the guide route at the time when automatic retrieval is performed.

On the other hand, as illustrated in FIG. 5, the vehicle control device 410 according to the present embodiment includes a communication control unit 521, a sensor data acquisition unit 522, a traveling control unit 523, and a position estimation unit 524 as a functional configuration.

The communication control unit 521 controls wireless communication executed between itself and the control equipment 101. For example, the communication control unit 521 authenticates the vehicle control device 410 by transmitting or receiving predetermined data to/from the control equipment 101, transmits a predetermined completion notification to the control equipment 101 when automatic parking and automatic retrieval are completed, and receives parking lot data such as the map data of the parking lot P and the guide route from the control equipment 101 as needed. Thus, the communication control unit 521 functions as an acquisition unit that acquires the map data (parking lot data) of the parking lot P.

In the present embodiment, the map data includes, for example, information for specifying absolute positions of various road surface signs for estimating a position that may be disposed on the road surface of the parking lot P, and specifying directionality (absolute azimuth) included in a road surface sign for estimating an azimuth.

The sensor data acquisition unit 522 is an example of an acquisition unit that acquires image data obtained by the vehicle-mounted camera 408, and acquires sensor data including the image data and data output from various sensors disposed in the vehicle control system 102. The sensor data acquired by the sensor data acquisition unit 522 can be used for various kinds of traveling control of the vehicle V executed by the traveling control unit 523 (described later) such as generation of an actual traveling route (including a parking route and retrieving route) based on the guide route received from the control equipment 101, and setting of various parameters (such as a vehicle speed, a rudder angle, and a moving direction) required at the time of actually traveling along the traveling route, for example.

By controlling the braking system 401, the accelerating system 402, the steering system 403, the gear shift system 404, and the like, the traveling control unit 523 controls the traveling state of the vehicle V to execute various kinds of traveling control for implementing automatic parking and automatic retrieval such as starting control from the getting-out region P1, traveling control (including parking control) from the getting-out region P1 to the parking region R, traveling control (including retrieving control) from the parking region R to the getting-in region P2, and stopping control at the getting-in region P2.

During automatic traveling of the vehicle V for automatic parking and automatic retrieval, the position estimation unit 524 estimates the current position of the vehicle V using the position estimation method described above. The position estimation unit 524 then corrects an estimation result of the current position of the vehicle V obtained by the position estimation method to cancel a cumulative error therein based on the image data acquired by the sensor data acquisition unit 522, and estimates the current position (actual position) of the vehicle V.

Thus, in the present embodiment, during a period in which automatic traveling is performed, the position estimation unit 524 first detects a road surface sign for estimating a position positioned around the vehicle V from the image data acquired by the sensor data acquisition unit 522 to calculate a relative position as a relative position of the road surface sign for estimating a position with respect to the vehicle V on the image data. The position estimation unit 524 then corrects the estimation result of the position of the vehicle V obtained by the position estimation method based on a difference between a calculative absolute position of the road surface sign for estimating a position that is specified based on the relative position of the road surface sign for estimating a position and a proper absolute position of the road surface sign for estimating a position based on the parking lot data acquired by the communication control unit 521, and sets a corrected value as a proper estimation value of the current position (actual position) of the vehicle V.

The position estimation unit 524 also estimates the azimuth in which the vehicle V moves using the position estimation method described above during automatic traveling of the vehicle V for automatic parking and automatic retrieval. The position estimation unit 524 then corrects an estimation result of the azimuth in which the vehicle V moves obtained by odometry, Dead Reckoning, and the like to cancel the cumulative error therein based on the image data acquired by the sensor data acquisition unit 522.

In the present embodiment, the position estimation unit 524 detects the road surface sign for estimating an azimuth positioned around the vehicle V from the image data acquired by the sensor data acquisition unit 522 during automatic traveling to calculate the relative azimuth as a relative azimuth of the road surface sign for estimating an azimuth with respect to the vehicle V on the image data. The position estimation unit 524 is an example of a correction unit that corrects the estimation result of the azimuth in which the vehicle V moves obtained by the position estimation method based on a shift (difference) between the calculative absolute azimuth of the road surface sign for estimating an azimuth that is specified based on the relative azimuth of the road surface sign for estimating an azimuth and the proper absolute azimuth of the road surface sign for estimating an azimuth based on the parking lot data acquired by the communication control unit 521, and causes the corrected absolute azimuth of the vehicle V to be a current azimuth in which the vehicle V moves.

Figure 6:
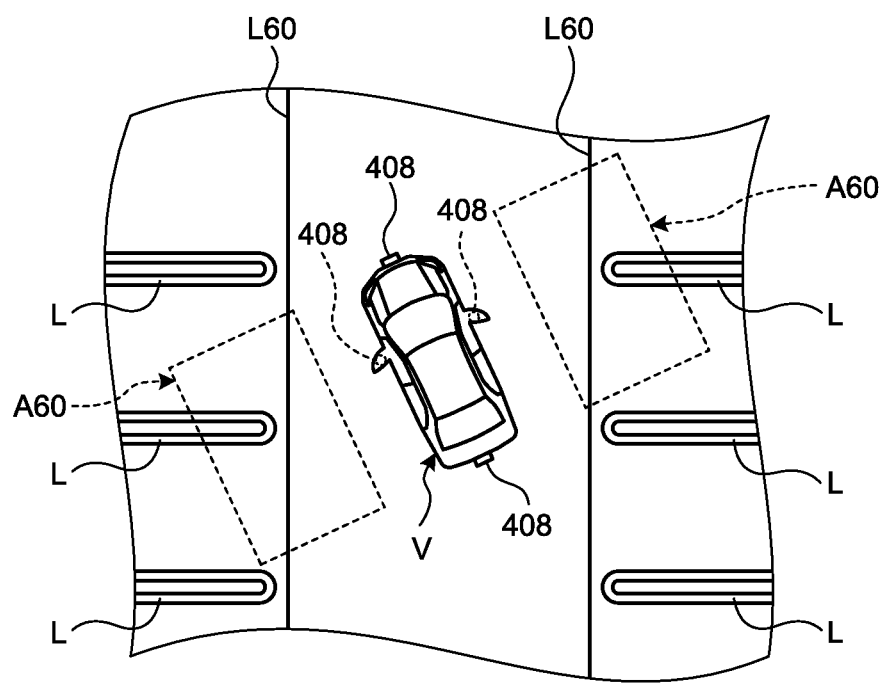
FIG. 6 is an exemplary and schematic diagram for explaining an example of a method of estimating an azimuth in which a vehicle moves that may be performed by a position estimation unit of the vehicle control device according to the present embodiment.

FIG. 6 is an exemplary and schematic diagram for explaining an example of a method of estimating an azimuth in which the vehicle moves that may be performed by the position estimation unit of the vehicle control device according to the present embodiment. In the example illustrated in FIG. 6, the vehicle V travels in a direction parallel with roadway outside lines L60 positioned on lateral sides of the vehicle V. In this case, the roadway outside line L60 is a line drawn on the road surface on which the vehicle V travels.

In the example illustrated in FIG. 6, an imaging range of the vehicle-mounted camera 408 disposed on a side part (for example, a side mirror) of the vehicle V corresponds to a region A60 including the roadway outside line L60. Thus, when image recognition processing such as white line detection processing is performed on the image data obtained by the vehicle-mounted camera 408 disposed on the side part of the vehicle V, the roadway outside line L60 can be detected as the road surface sign for estimating an azimuth. By utilizing the detected roadway outside line L60, a relative azimuth of the roadway outside line L60 with respect to the vehicle V (more specifically, the relative azimuth representing a direction in which the roadway outside line L60 extends) can be calculated. By utilizing the calculated relative azimuth and the estimation result of the azimuth of the vehicle V obtained by the position estimation method, the calculative absolute azimuth of the roadway outside line L60 can be specified.

In this case, the calculative absolute azimuth of the roadway outside line L60 is specified by utilizing the estimation result based on the position estimation method as described above, so that the calculative absolute azimuth may include influence of the cumulative error caused by the position estimation method. On the other hand, as described above, the map data of the parking lot P managed by the control equipment 101 includes the information for specifying the proper absolute azimuth of the road surface sign for estimating an azimuth, so that the map data includes partition line data for specifying the proper absolute azimuth of the roadway outside line L60 as the road surface sign for estimating an azimuth.

Thus, in the present embodiment, the communication control unit 521 acquires the partition line data as the map data from the control equipment 101. The position estimation unit 524 then takes a difference between the calculative absolute azimuth of the roadway outside line L60 described above and the proper absolute azimuth of the roadway outside line L60 that is specified based on the partition line data, corrects a shift of the estimation result obtained by the position estimation method based on the difference, and estimates a corrected value as an actual azimuth of the vehicle V. Due to this, the current azimuth of the vehicle V during automatic traveling can be correctly grasped without disposing an exclusive road surface sign for estimating an azimuth on the road surface.

Figure 7:
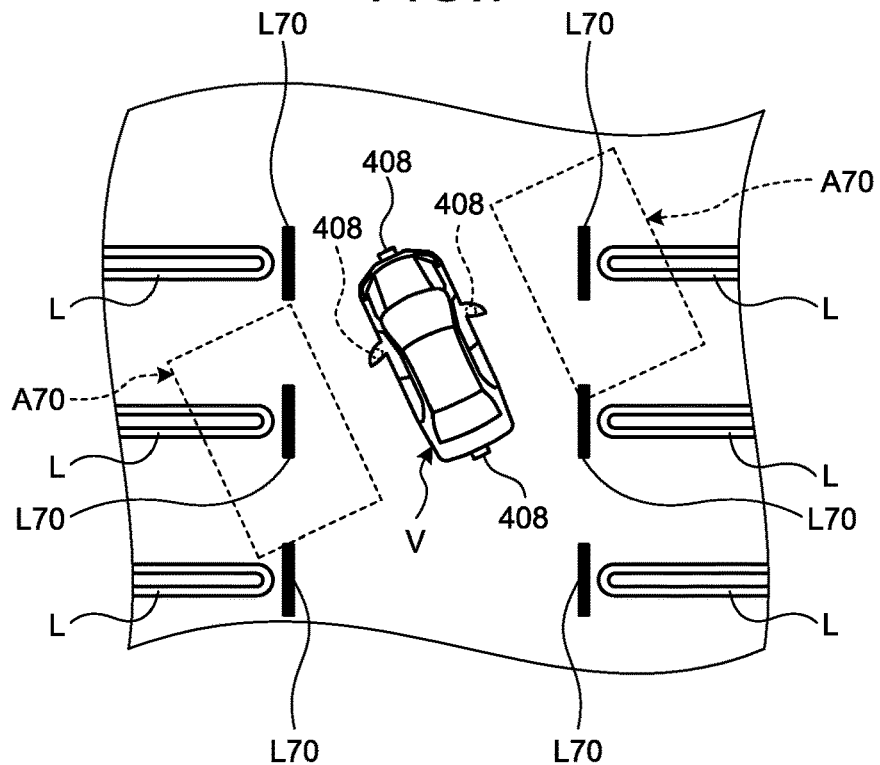
FIG. 7 is an exemplary and schematic diagram for explaining an example different from that in FIG. 6 of the method of estimating the azimuth in which the vehicle moves that may be performed by the position estimation unit of the vehicle control device according to the present embodiment.

FIG. 7 is an exemplary and schematic diagram for explaining an example different from that in FIG. 6 of the method of estimating an azimuth in which the vehicle moves that may be performed by the position estimation unit of the vehicle control device according to the present embodiment. In the example illustrated in FIG. 7, the vehicle V travels in a direction parallel with azimuth markers L70 positioned on lateral sides of the vehicle V. In this case, the azimuth marker L70 is a linear marker drawn on the road surface on which the vehicle V travels.

In the example illustrated in FIG. 7, the imaging range of the vehicle-mounted camera 408 disposed on a side part (for example, a side mirror) of the vehicle V corresponds to a region A70 including the azimuth marker L70. Thus, when image recognition processing such as white line detection processing is performed on image data obtained by the vehicle-mounted camera 408 disposed on the side part of the vehicle V, the azimuth marker L70 can be detected as the road surface sign for estimating an azimuth. By utilizing the detected azimuth marker L70, a relative azimuth of the azimuth marker L70 with respect to the vehicle V (more specifically, a relative azimuth representing a direction in which the azimuth marker L70 extends) can be calculated. By utilizing the calculated relative azimuth and the estimation result of the azimuth of the vehicle V based on the position estimation method, the calculative absolute azimuth of the azimuth marker L70 can be specified.

In this case, the calculative absolute azimuth of the azimuth marker L70 is specified by utilizing the estimation result based on the position estimation method as described above, so that the calculative absolute azimuth may include influence of the cumulative error caused by the position estimation method. On the other hand, as described above, the map data of the parking lot P managed by the control equipment 101 includes information for specifying the proper absolute azimuth of the road surface sign for estimating an azimuth, so that the map data includes partition line data for specifying the proper absolute azimuth of the azimuth marker L70 as the road surface sign for estimating an azimuth.

Thus, in the present embodiment, the communication control unit 521 acquires the partition line data as the map data from the control equipment 101. The position estimation unit 524 then takes a difference between the calculative absolute azimuth of the azimuth marker L70 described above and the proper absolute azimuth of the azimuth marker L70 that is specified based on the partition line data, corrects a shift of the estimation result obtained by the position estimation method based on the difference, and estimates a corrected value as an actual azimuth of the vehicle V.

In the present embodiment, the position estimation unit 524 corrects the estimation result of the azimuth of the vehicle V obtained by the position estimation method by using a linear road surface sign such as the roadway outside line L60 or the azimuth marker L70 that is disposed on the road surface on which the vehicle V travels and different from a parking partition line indicating a parking frame (for example, a linear road surface sign for estimating an azimuth drawn in parallel with the azimuth in which the vehicle V moves), but the linear road surface sign is not limited thereto. Any linear road surface sign can be used so long as the linear road surface sign can specify the absolute azimuth of the road surface sign for estimating an azimuth based on the partition line data included in the map data. For example, the position estimation unit 524 can also correct the estimation result of the azimuth of the vehicle V obtained by the position estimation method by using the parking partition line for partitioning the parking region R of the parking lot P, or using a pedestrian crossing, a stop line, and the like drawn on the road surface as the road surface sign for estimating an azimuth.

Figure 8:
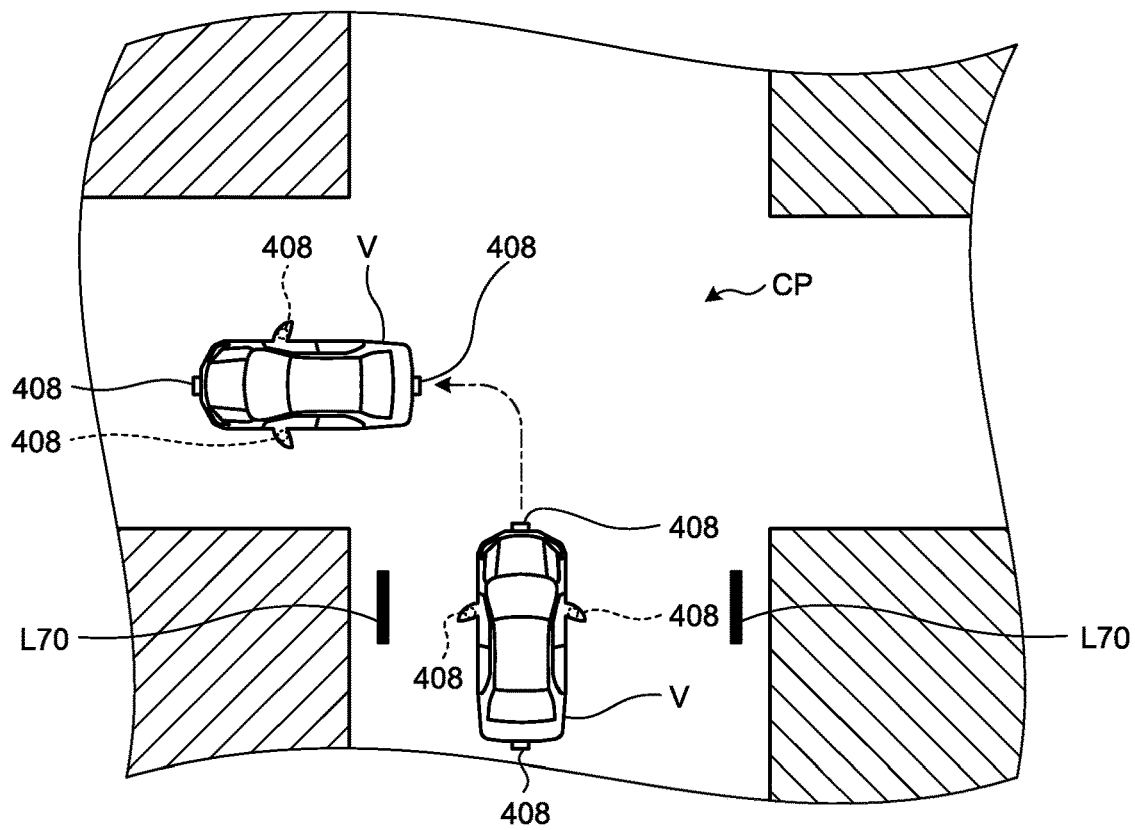
FIG. 8 is an exemplary and schematic diagram for explaining an example of the method of estimating the azimuth in which the vehicle moves that may be performed by the position estimation unit of the vehicle control device according to the present embodiment.

FIG. 8 is an exemplary and schematic diagram for explaining an example of the method of estimating the azimuth in which the vehicle moves that may be performed by the position estimation unit of the vehicle control device according to the present embodiment. In the example illustrated in FIG. 8, the position estimation unit 524 corrects the estimation result of the azimuth of the vehicle V obtained by the position estimation method using image data obtained by the vehicle-mounted camera 408 that is disposed on the side part of the vehicle V at the time when the vehicle V traveling in a direction parallel with the azimuth marker L70 positioned on the lateral side of the vehicle V comes in front of an intersection CP. The cumulative error in the estimation result of the azimuth of the vehicle V obtained by the position estimation method tends to influence the azimuth in which the vehicle V moves after the moving direction of the vehicle V is changed.

Thus, in the embodiment, the position estimation unit 524 corrects the estimation result of the azimuth of the vehicle V obtained by the position estimation method using image data that is obtained by the vehicle-mounted camera 408 at the time when the vehicle V enters the intersection CP and before the moving direction of the vehicle V is changed. At this point, it is preferable that the position estimation unit 524 corrects the estimation result of the azimuth of the vehicle V using the image data that is obtained by the vehicle-mounted camera 408 at the time when the vehicle V stops in front of the intersection CP. Due to this, it is possible to improve accuracy in specifying the calculative absolute azimuth of the azimuth marker L70 using the image data obtained by the vehicle-mounted camera 408, so that the estimation result of the azimuth of the vehicle V obtained by the position estimation method can be corrected with high accuracy.

Figure 9:
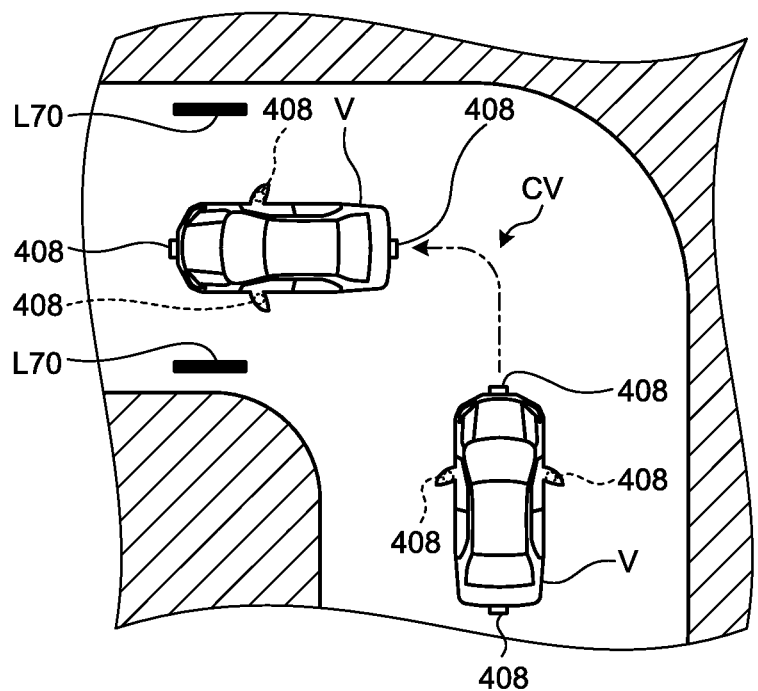
FIG. 9 is an exemplary and schematic diagram for explaining an example of the method of estimating the azimuth in which the vehicle moves that may be performed by the position estimation unit of the vehicle control device according to the present embodiment.

FIG. 9 is an exemplary and schematic diagram for explaining an example of the method of estimating the azimuth in which the vehicle moves that may be performed by the position estimation unit of the vehicle control device according to the present embodiment. In the example illustrated in FIG. 9, the position estimation unit 524 corrects the estimation result of the azimuth of the vehicle V obtained by the position estimation method using image data that is obtained by the vehicle-mounted camera 408 disposed on the side part of the vehicle V after the vehicle V traveling in a direction parallel with the azimuth marker L70 positioned on the lateral side of the vehicle V passes through a curve CV. As described above, the cumulative error in the estimation result of the azimuth of the vehicle V obtained by the position estimation method tends to influence the azimuth in which the vehicle V moves after the moving direction of the vehicle V is changed.

Thus, in the present embodiment, the position estimation unit 524 corrects the estimation result of the azimuth of the vehicle V obtained by the position estimation method using image data that is obtained by the vehicle-mounted camera 408 after the vehicle V passes through the curve CV and the moving direction of the vehicle V is changed. In a case of passing through the intersection CP (refer to FIG. 8), the vehicle V stops in front of the intersection CP to prevent a minor collision with another vehicle entering the intersection CP from another direction. Thus, in a case in which the moving direction of the vehicle V is changed at the intersection CP, it is preferable that the position estimation unit 524 corrects the estimation result of the azimuth of the vehicle V using image data that is obtained by the vehicle-mounted camera 408 at the time when the vehicle V stops in front of the intersection CP. On the other hand, in a case in which the azimuth of the vehicle V is changed due to the curve CV and the like, another vehicle rarely enters the curve CV at the same time, and the vehicle V hardly stops at a point before the azimuth of the vehicle V is changed (that is, in front of the curve CV) after entering the curve CV.

Thus, in the present embodiment, the position estimation unit 524 corrects the estimation result of the azimuth of the vehicle V using image data that is obtained by the vehicle-mounted camera 408 at the time when the vehicle V stops after passing through the curve CV. Due to this, it is possible to correct an error in the estimation result of the azimuth of the vehicle V obtained by the position estimation method caused in a period in which the moving direction of the vehicle V is changed after passing through the curve CV and the like, so that it is possible to correct, with high accuracy, the estimation result of the azimuth of the vehicle V obtained by the position estimation method after the moving direction of the vehicle V is changed.

In the present embodiment, as described above, the position estimation unit 524 detects the road surface sign for estimating an azimuth from the image data that is obtained by the vehicle-mounted camera 408 at the time when the moving direction of the vehicle V is changed after passing through the intersection CP, the curve CV, and the like, and corrects the estimation result of the azimuth of the vehicle V using the detection result thereof. However, the position estimation unit 524 is not limited thereto, and any position estimation unit can be used so long as the position estimation unit detects the road surface sign for estimating an azimuth such as the roadway outside line L60 and the azimuth marker L70 from the image data obtained by the vehicle-mounted camera 408 at a predetermined position and corrects the estimation result of the azimuth of the vehicle V using a detection result thereof.

For example, the position estimation unit 524 may detect the road surface sign for estimating an azimuth from image data that is obtained by the vehicle-mounted camera 408 at a position after the vehicle V travels for a distance set in advance (for example, a distance at which the error in the estimation result of the azimuth of the vehicle V obtained by the position estimation method is equal to or larger than a threshold set in advance), and correct the estimation result of the azimuth of the vehicle V using a detection result thereof. At this point, to improve accuracy in correcting the azimuth of the vehicle V by the position estimation method, the position estimation unit 524 preferably detects the road surface sign for estimating an azimuth from image data that is obtained by the vehicle-mounted camera 408 at the time when the vehicle V stops, and corrects the estimation result of the azimuth of the vehicle V using a detection result thereof.

In the present embodiment, the image data that is obtained by the vehicle-mounted camera 408 disposed on the side part of the vehicle V is used for detecting the relative azimuth of the road surface sign for estimating an azimuth such as the roadway outside line L60 and the azimuth marker L70. Alternatively, image data that is obtained by the vehicle-mounted camera 408 disposed on a front part (for example, a front bumper) of the vehicle V, image data that is obtained by the vehicle-mounted camera 408 disposed on a rear part (for example, a rear bumper), and the like may be used.

Figure 10:
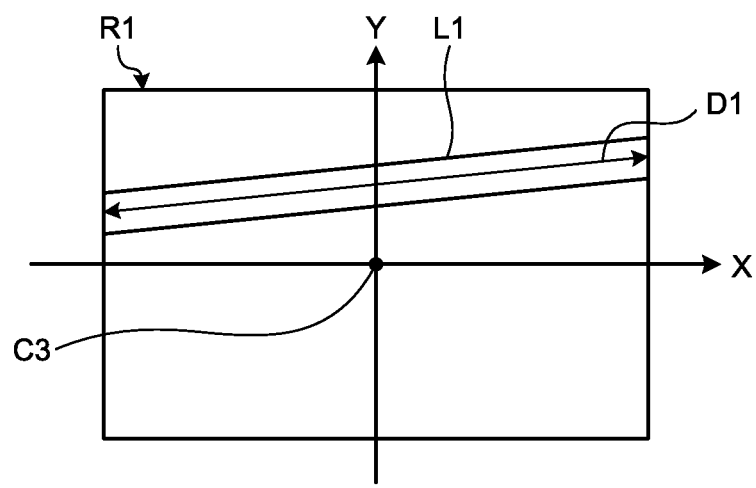
FIG. 10 is an exemplary and schematic diagram for explaining details of correction considering a relative azimuth of a road surface sign for estimating an azimuth that may be performed by the position estimation unit of the vehicle control device according to the present embodiment.

FIG. 10 is an exemplary and schematic diagram for explaining details of correction considering the relative azimuth of the road surface sign for estimating an azimuth that may be performed by the position estimation unit of the vehicle control device according to the present embodiment.

In FIG. 10, a region R1 having a rectangular shape is a region representing the imaging range of the vehicle-mounted camera 408 in a plan view, the region generated by performing projective transformation on the image data acquired by the vehicle-mounted camera 408. The region R1 includes a roadway outside line L1 extending in a direction D1 as an example of the road surface sign for estimating an azimuth.

As illustrated in FIG. 10, the position estimation unit 524 according to the present embodiment first configures an X-Y coordinate system by setting a center C3 of the region R1 as an origin, and calculates a value indicating a relative azimuth of the roadway outside line L1 with respect to the origin. The X-axis is set to be matched with orientation of the vehicle V (not illustrated in FIG. 10), and the Y-axis is set to be matched with orientation of the vehicle-mounted camera 408. In the example illustrated in FIG. 10, as a value indicating the relative azimuth, calculated is a value representing the direction D1 in which the roadway outside line L1 extends, for example, a counterclockwise angle based on the X-axis (10 degrees in the illustrated example).

When calculation of the relative azimuth is completed, the position estimation unit 524 specifies the calculative absolute azimuth of the roadway outside line L1 based on the relative azimuth and the azimuth of the vehicle V that is estimated based on the position estimation method.

On the other hand, the position estimation unit 524 extracts, from the map data acquired by the communication control unit 521, partition line data related to the roadway outside line around the position of the vehicle V that is estimated based on the position estimation method. The partition line data includes an absolute azimuth of the roadway outside line L1, for example. Thus, the position estimation unit 524 specifies the absolute azimuth representing a direction in which the roadway outside line L1 extends based on the partition line data extracted from the map data.

The position estimation unit 524 then takes a difference between the calculative absolute azimuth of the roadway outside line L1 that is specified based on the image data and the proper absolute azimuth of the roadway outside line L1 that is specified based on the map data (partition line data). This difference corresponds to the cumulative error in the estimation result of the azimuth of the vehicle V obtained by the position estimation method. Thus, the position estimation unit 524 corrects the estimation result of the azimuth of the vehicle V obtained by the position estimation method to cancel the cumulative error, and sets a corrected value as a current azimuth (actual azimuth) of the vehicle V.

Next, with reference to FIG. 11 to FIG. 15, the following-describes processing performed by the automated valet parking system according to the present embodiment.

Figure 11:
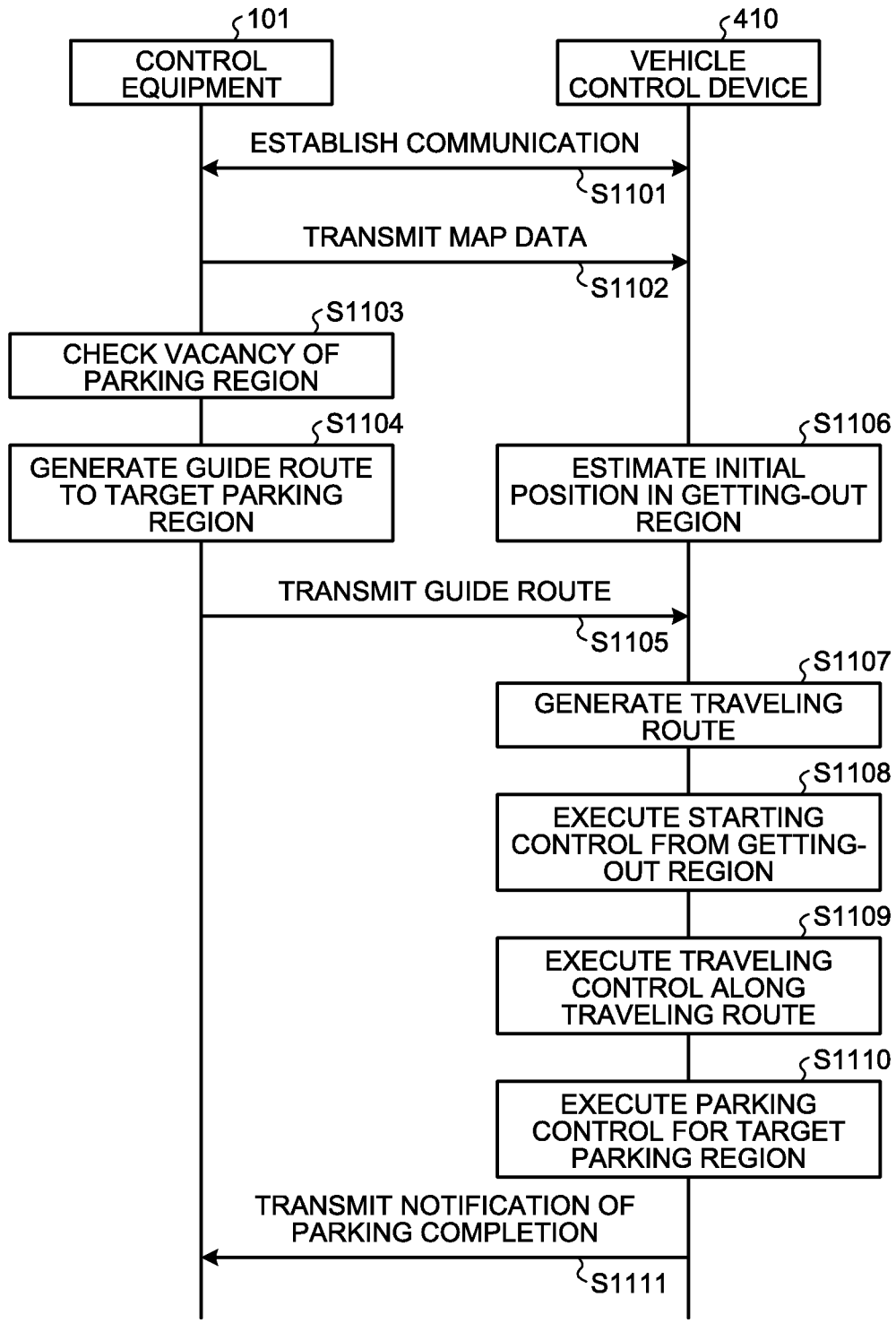
FIG. 11 is an exemplary and schematic sequence diagram illustrating a processing procedure performed by the control equipment and the vehicle control device in a case in which automatic parking is performed in the present embodiment.

FIG. 11 is an exemplary and schematic sequence diagram illustrating a processing procedure performed by the control equipment and the vehicle control device in a case in which automatic parking is performed in the present embodiment. A processing sequence illustrated in FIG. 11 is started in a case in which the occupant X operates the terminal device T in the getting-out region P1 to make a predetermined instruction as a trigger for automatic parking.

In the processing sequence illustrated in FIG. 11, first, communication between the control equipment 101 and the vehicle control device 410 is established at S1101. At S1101, authentication by transmitting/receiving identification information (ID), transfer of an operation right for implementing automatic traveling under monitoring by the control equipment 101, and the like are performed.

When communication is established at S1101, the control equipment 101 transmits the map data of the parking lot P to the vehicle control device 410 at S1102.

The control equipment 101 then checks vacancy of the parking region R at S1103, and designates one vacant parking region R as a target parking region to be given to the vehicle V.

At S1104, the control equipment 101 then generates a (brief) guide route from the getting-out region P1 to the target parking region designated at S1103.

At S1105, the control equipment 101 transmits the guide route generated at S1104 to the vehicle control device 410.

On the other hand, the vehicle control device 410 estimates an initial position in the getting-out region P1 at S1106 after receiving the map data that is transmitted from the control equipment 101 at S1102. The initial position is the current position of the vehicle V in the getting-out region P1 to be a starting point for driving off from the getting-out region P1. To estimate the initial position, a method using the image data obtained by the vehicle-mounted camera 408 may be used similarly to the estimation of the current position described above. In the example illustrated in FIG. 11, the processing at S1106 is performed before the processing at S1105, but the processing at S1106 may be performed after the processing at S1105.

After estimating the initial position at S1106 and receiving the guide route that is transmitted from the control equipment 101 at S1105, the vehicle control device 410 generates, at S1107, a traveling route having higher accuracy than that of the guide route that should be followed in actual automatic parking based on the initial position and the like estimated at S1106.

At S1108, the vehicle control device 410 then executes starting control from the getting-out region P1.

At S1109, the vehicle control device 410 then executes traveling control along the traveling route generated at S1107. This traveling control is executed while estimating the current position by the method using the image data as described above.

The vehicle control device 410 then executes parking control for the target parking region at S1110.

When parking control is completed at S1110, the vehicle control device 410 transmits a notification of parking completion to the control equipment 101 at S1111.

Automatic parking in automated valet parking is implemented as described above.

Figure 12:
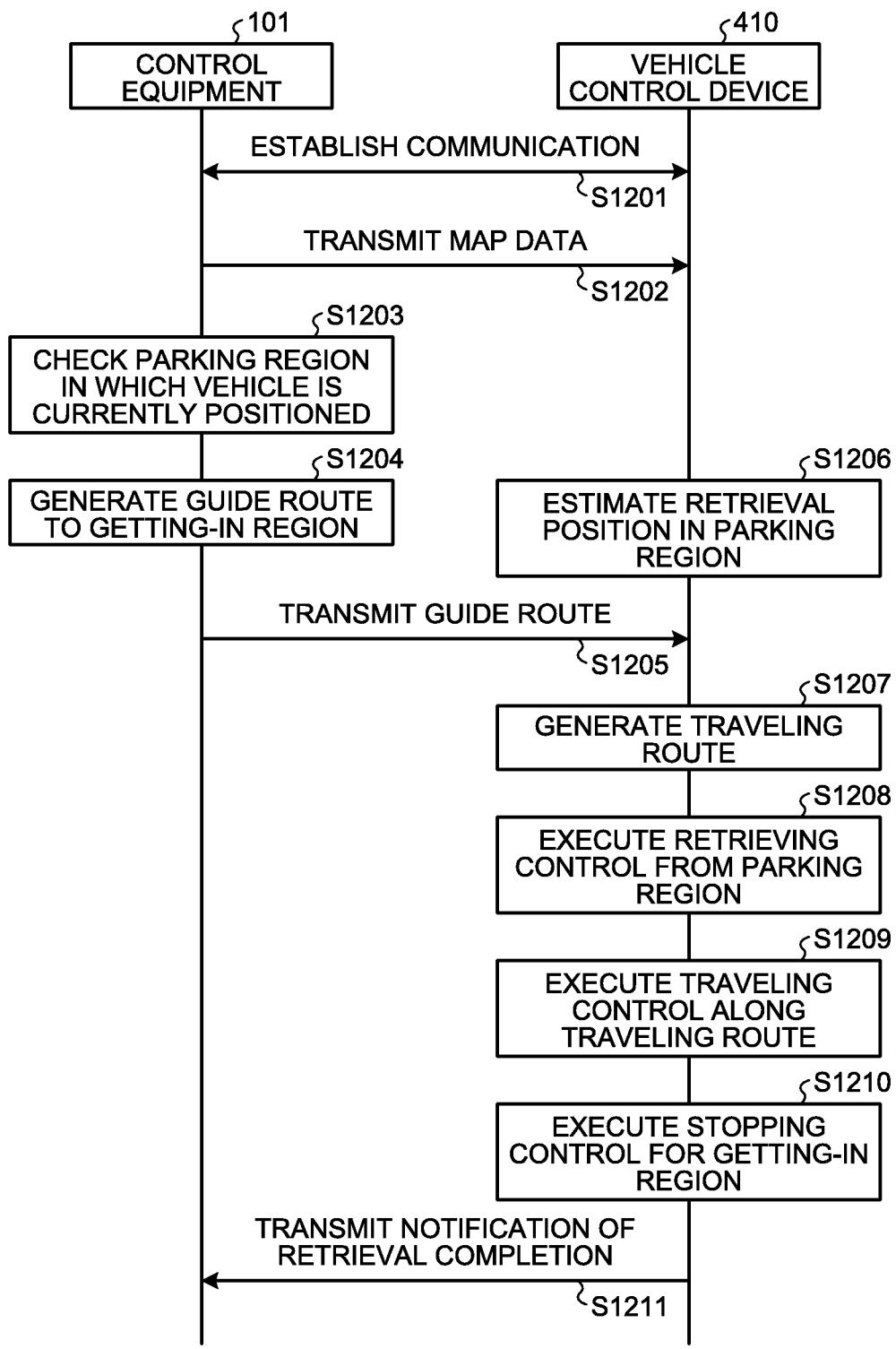
FIG. 12 is an exemplary and schematic sequence diagram illustrating a processing procedure performed by the control equipment and the vehicle control device in a case in which automatic retrieval is performed in the present embodiment.

FIG. 12 is an exemplary and schematic sequence diagram illustrating a processing procedure performed by the control equipment and the vehicle control device in a case in which automatic retrieval is performed in the present embodiment. The processing sequence illustrated in FIG. 12 is started when the occupant X operates the terminal device T in the getting-in region P2 to make a predetermined call as a trigger for automatic retrieval.

In the processing sequence illustrated in FIG. 12, first, communication between the control equipment 101 and the vehicle control device 410 is established at S1201. At S1201, similarly to S1101 in FIG. 11 described above, authentication by transmitting/receiving identification information (ID), transfer of an operation right for implementing automatic traveling under monitoring by the control equipment 101, and the like are performed.

When communication is established at S1201, the control equipment 101 transmits the map data of the parking lot P to the vehicle control device 410 at S1202.

At S1203, the control equipment 101 checks the parking region R in which the vehicle V equipped with the vehicle control device 410 as a communication counterpart is currently positioned. In the embodiment, the processing at S1203 is performed based on the image data and the like obtained by the surveillance camera 103.

At S1204, the control equipment 101 generates a (brief) guide route from the parking region R checked at S1203 to the getting-in region P2.

At S1205, the control equipment 101 transmits the guide route generated at S1204 to the vehicle control device 410.

On the other hand, at S1206 after receiving the map data that is transmitted from the control equipment 101 at S1202, the vehicle control device 410 estimates a retrieval position in the parking region R in which the vehicle V is currently positioned. The retrieval position is the current position of the vehicle V in the parking region R to be a starting point for retrieval from the parking region R. To estimate the retrieval position, a method similar to the method of estimating the current position described above (a method using the map data and the road surface sign for estimating a position detected from the image data by image recognition processing) may be used. In the example illustrated in FIG. 12, the processing at S1206 is performed before the processing at S1205, but the processing at S1206 may be performed after the processing at S1205.

After estimating the retrieval position at S1206 and receiving the guide route that is transmitted from the control equipment 101 at S1205, the vehicle control device 410 generates, at S1207, a traveling route having higher accuracy than that of the guide route that should be followed in actual automatic retrieval based on the retrieval position and the like estimated at S1206.

The vehicle control device 410 then executes retrieving control from the parking region R at S1208.

At S1209, the vehicle control device 410 then executes traveling control along the traveling route generated at S1207. Similarly to the traveling control at S1109 in FIG. 11, this traveling control is also executed while estimating the current position by the method using the image data as described above.

The vehicle control device 410 then executes stopping control for the getting-in region P2 at S1210.

When the stopping control at S1210 is completed, the vehicle control device 410 transmits a notification of retrieval completion to the control equipment 101 at S1211.

Automatic parking in automated valet parking is implemented as described above.

Figure 13:
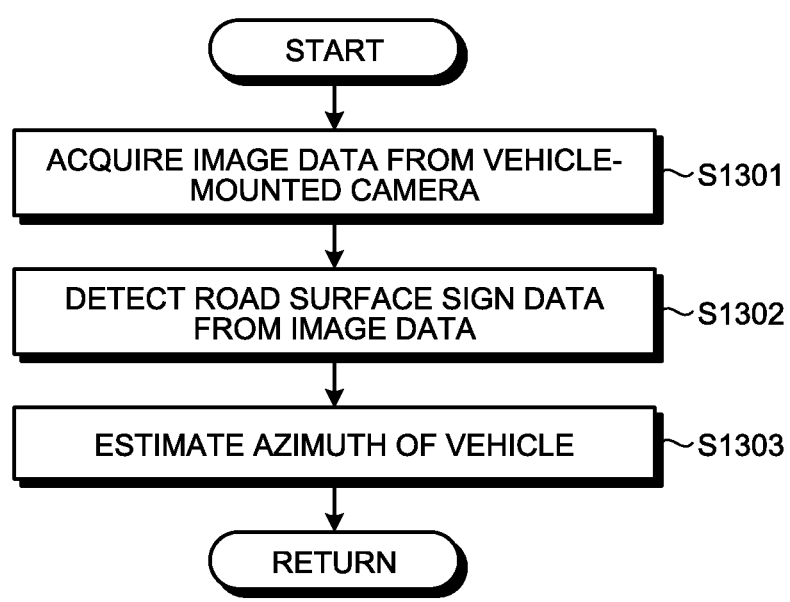
FIG. 13 is an exemplary and schematic flowchart illustrating a procedure of correction processing for the azimuth of the vehicle included in traveling control performed by the vehicle control device in a case in which automatic parking and automatic retrieval are performed in the present embodiment.

FIG. 13 is an exemplary and schematic flowchart illustrating a procedure of correction processing for the azimuth of the vehicle included in traveling control performed by the vehicle control device in a case in which automatic parking and automatic retrieval are performed in the present embodiment. A processing flow illustrated in FIG. 13 is repeatedly performed during automatic traveling of the vehicle V at S1109 illustrated in FIG. 11, at S1209 illustrated in FIG. 12, and the like.

In the processing flow illustrated in FIG. 13, first, the vehicle control device 410 acquires the image data from the vehicle-mounted camera 408 at S1301.

At S1302, the vehicle control device 410 detects road surface sign data on the image data from the image data acquired at S1301 through predetermined image recognition processing. At S1302, for example, processing is performed in accordance with a processing flow illustrated in the following FIG. 14.

Figure 14:
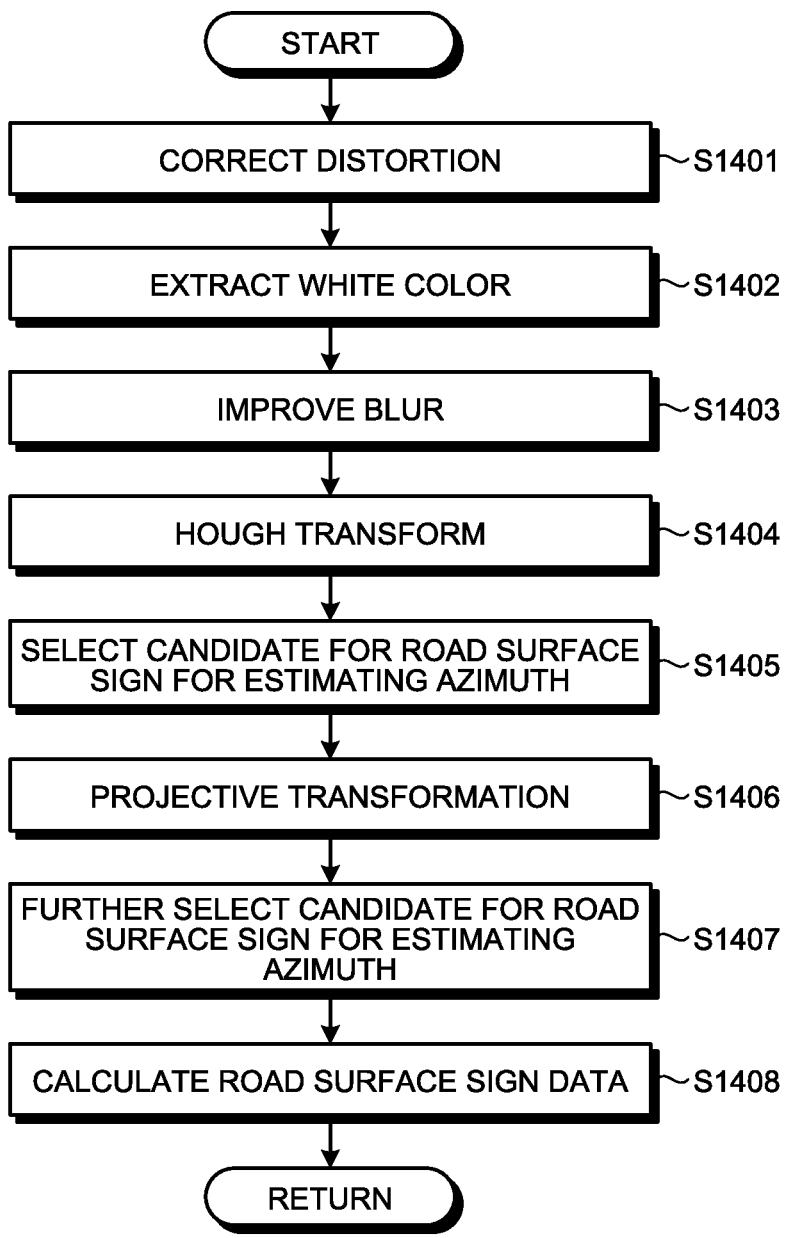
FIG. 14 is an exemplary and schematic flowchart illustrating a procedure of calculation processing for road surface sign data including an absolute azimuth of a road surface sign for estimating an azimuth performed by the vehicle control device in a case in which traveling control is performed in the present embodiment.

FIG. 14 is an exemplary and schematic flowchart illustrating a procedure of calculation processing for the road surface sign data including the absolute azimuth of the road surface sign for estimating an azimuth performed by the vehicle control device in a case in which traveling control is performed in the present embodiment. By way of example, the following describes a processing procedure for detecting the roadway outside line L60 or the azimuth marker L70 as the road surface sign for estimating an azimuth.

In the processing flow illustrated in FIG. 14, first, the vehicle control device 410 performs distortion correction processing on the image data acquired from the vehicle-mounted camera 408 at S1401.

At S1402, the vehicle control device 410 performs white color extraction processing on the image data subjected to the distortion correction processing at S1401. The road surface sign for estimating an azimuth such as the roadway outside line L60 and the azimuth marker L70 is typically drawn in white, so that a white region including the road surface sign for estimating an azimuth can be extracted from the image data subjected to the distortion correction processing through the processing at S1402.

At S1403, the vehicle control device 410 performs blur improvement processing for improving a blur that may be included in the white region extracted at S1402.

At S1404, the vehicle control device 410 performs Hough transform on the image data subjected to the blur improvement processing at S1403, and extracts a linear region as a candidate for the road surface sign for estimating an azimuth from the image data.

At S1405, the vehicle control device 410 selects the candidate for the road surface sign for estimating an azimuth extracted at S1404 on a predetermined criterion.

At S1406, the vehicle control device 410 performs projective transformation on the image data including the candidate selected at S1405, and generates image data corresponding to a region representing the imaging range of the vehicle-mounted camera 408 in a plan view.

At S1407, the vehicle control device 410 further selects the candidate for the road surface sign for estimating an azimuth included in the image data subjected to projective transformation on a predetermined criterion.

At S1408, the vehicle control device 410 calculates the relative azimuth of the candidate extracted at S1407 as the road surface sign data.

When the pieces of processing at S1401 to S1408 described above are completed, the process proceeds to S1303 in FIG. 13. At S1303, the vehicle control device 410 performs processing in accordance with a processing flow illustrated in the following FIG. 15 to estimate the azimuth of the vehicle V.

FIG. 15 is an exemplary and schematic flowchart illustrating a procedure of correction processing for the azimuth of the vehicle performed by the vehicle control device in a case in which traveling control is performed in the present embodiment.

In the processing flow illustrated in FIG. 15, first, the vehicle control device 410 acquires the azimuth of the vehicle V estimated by the position estimation method at S1501.

At S1502, the vehicle control device 410 calculates the relative azimuth of the road surface sign for estimating an azimuth with respect to the current position based on the road surface sign data calculated by the processing flow illustrated in FIG. 14. By utilizing the relative azimuth calculated at S1502 and the azimuth of the vehicle V acquired at S1501, a calculative absolute position of the road surface sign for estimating an azimuth can be specified.

At S1503, the vehicle control device 410 specifies the absolute azimuth of the road surface sign for estimating an azimuth based on the map data acquired by the communication control unit 521. More specifically, by extracting, from absolute azimuths of all road surface signs for estimating an azimuth included in the map data, a calculative absolute azimuth of the road surface sign for estimating an azimuth disposed at a position close to the current position of the vehicle V that is estimated based on the image data, the vehicle control device 410 specifies a proper absolute azimuth of the road surface sign for estimating an azimuth a difference of which from the calculative absolute azimuth is taken in the next processing at S1504.

For example, in a case in which the image data from which the road surface sign data is calculated is image data obtained by the vehicle-mounted camera 408 that is disposed on the side part on the left side of the vehicle V, the vehicle control device 410 extracts, from the absolute azimuths of all the road surface signs for estimating an azimuth included in the map data, an absolute azimuth corresponding to the left side of the current position of the vehicle V based on the position estimation method.

At S1504, the vehicle control device 410 takes a difference between the calculative absolute azimuth of the road surface sign for estimating an azimuth that is specified based on the calculation result at S1502 and the proper absolute azimuth of the road surface sign for estimating an azimuth specified at S1503, and corrects, based on the difference, the calculated value at S1501, that is, the calculated value of the current azimuth of the vehicle V based on the position estimation method.

At S1505, the vehicle control device 410 estimates the corrected value at S1504 as a proper azimuth of the vehicle V. In the present embodiment, various parameters (a vehicle speed, a rudder angle, a moving direction, and the like) required for automatic traveling of the vehicle V are set based on an estimation result obtained at S1505.

As described above, the vehicle control device 410 according to the present embodiment includes the traveling control unit 523 that controls the traveling state of the vehicle V to implement automatic traveling in the parking lot P. The vehicle control device 410 also includes the communication control unit 521 that acquires the parking lot data that can specify the absolute azimuth of the road surface sign for estimating an azimuth disposed on the road surface of the parking lot P, the sensor data acquisition unit 522 that acquires the image data obtained by the vehicle-mounted camera 408, and the position estimation unit 524 that calculates the relative azimuth of the road surface sign for estimating an azimuth with respect to the vehicle V on the image data by detecting the road surface sign for estimating an azimuth from the image data during automatic traveling, and estimates the actual azimuth of the vehicle V based on the calculated relative azimuth and the parking lot data.

According to the present embodiment, based on the configuration described above, the current azimuth (actual azimuth) of the vehicle V during automatic traveling can be correctly grasped considering a shift between the calculative azimuth of the road surface sign for estimating an azimuth that is specified by utilizing the relative azimuth calculated based on the image data and the proper absolute azimuth of the road surface sign for estimating an azimuth that is specified based on the parking lot data.

In the present embodiment, by detecting the road surface sign data for estimating an azimuth from the image data representing a situation of one of the left side and the right side of the vehicle V, the position estimation unit 524 can calculate the relative azimuth of the road surface sign for estimating an azimuth present on one of the left side and the right side of the vehicle V. With this configuration, the relative azimuth of the road surface sign for estimating an azimuth can be easily calculated by utilizing the image data in which the road surface sign for estimating an azimuth tends to be reflected.

In the present embodiment, the communication control unit 521 acquires, as the parking lot data, the partition line data that can specify the absolute azimuth of the roadway outside line L60 or the azimuth marker L70 disposed in the parking lot P in advance, and the position estimation unit 524 calculates, as the road surface sign data, the orientation of the roadway outside line L60 or the azimuth marker L70 on the image data. Accordingly, the relative azimuth of the roadway outside line L60 or the azimuth marker L70 can be calculated, and the actual azimuth of the vehicle V can be estimated based on the calculated relative azimuth and the partition line data. With this configuration, the actual azimuth of the vehicle V can be easily estimated by utilizing the roadway outside line L60 that is typically disposed on the road surface. As the road surface sign for estimating an azimuth, a pedestrian crossing, a stop line, and the like present in the parking lot P can be applied.

In the embodiment described above, exemplified is a case in which the technique according to the present invention is applied to the automated valet parking system. However, the technique according to the present invention can be applied to an automatic driving system other than the automated valet parking system so long as an appropriate road surface sign for estimating an azimuth is disposed in the system and the map data related to the absolute azimuth of the road surface sign for estimating an azimuth can be acquired.

In the embodiment described above, exemplified is the configuration in which the vehicle control device including the traveling control unit is disposed as a vehicle position estimation device in addition to the sensor data acquisition unit serving as a parking lot data acquisition unit, the sensor data acquisition unit serving as an image data acquisition unit, and the position estimation unit. However, in the present embodiment, a device not including the traveling control unit and different from the vehicle control device may be disposed as the vehicle position estimation device so long as the device includes at least the parking lot data acquisition unit, the image data acquisition unit, and the position estimation unit.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A vehicle control device comprising:
   at least one processor configured to implement:
   n acquisition unit configured to acquire map data indicating an absolute azimuth of a linear road surface sign disposed on a road surface on which a vehicle travels, and image data obtained by imaging surroundings of the vehicle with a vehicle-mounted camera included in the vehicle; and
   a correction unit configured to detect the road surface sign from the acquired image data, calculate a relative azimuth of the road surface sign with respect to the vehicle on the image data, calculate a shift of an azimuth in which the vehicle moves based on the calculated relative azimuth and the absolute azimuth of the detected road surface sign indicated by the map data, and correct the azimuth in which the vehicle moves based on the calculated shift.

2. The vehicle control device according to claim 1, wherein the road surface sign is a roadway outside line drawn on the road surface on which the vehicle travels.

3. The vehicle control device according to claim 1, wherein the road surface sign is a linear azimuth marker drawn on the road surface on which the vehicle travels.

4. The vehicle control device according to claim 1, wherein the road surface sign is a pedestrian crossing that is disposed on the road surface on which the vehicle travels.

5. The vehicle control device according to claim 1, wherein the road surface sign is a stop line that is disposed on the road surface on which the vehicle travels.

6. The vehicle control device according to claim 1, wherein the road surface sign is a linear road surface sign different from a parking partition line indicating a parking frame.

7. The vehicle control device according to claim 1, wherein the correction unit detects the road surface sign from the image data obtained by the vehicle-mounted camera at a predetermined position.

8. The vehicle control device according to claim 7, wherein the correction unit detects the road surface sign from the image data that is obtained by the vehicle-mounted camera at a time when the vehicle stops at the predetermined position.

* * * * *